United States Patent [19]

Lakatos et al.

[11] 3,932,025

[45] Jan. 13, 1976

[54] IMAGING SYSTEM

[75] Inventors: Andras I. Lakatos, Penfield; John B. Flannery, Webster, both of N.Y.

[73] Assignee: Xerox Corporation, Stamford, Conn.

[22] Filed: Oct. 25, 1974

[21] Appl. No.: 518,005

[52] U.S. Cl. ...... 350/160 R; 350/150; 340/173 LM; 96/1 R
[51] Int. Cl.² .. G02F 1/29; G02B 5/23; G03G 17/00
[58] Field of Search .......... 350/150, 160 R, 160 LC, 350/267; 340/173 LS, 173 LM; 96/1 R, 1 E; 346/74; 250/213 R, 331

[56]  References Cited
UNITED STATES PATENTS

| 3,592,527 | 7/1971 | Conners | 350/160 |
| 3,700,902 | 10/1972 | Buchan | 350/150 X |
| 3,711,719 | 1/1973 | Szepesi | 250/213 R |
| 3,778,149 | 12/1973 | Fields | 350/160 LC X |
| 3,803,408 | 4/1974 | Assouline et al. | 350/160 LC X |

Primary Examiner—Alfred E. Smith
Assistant Examiner—Rolf Hille
Attorney, Agent, or Firm—James J. Ralabate; David C. Petre; Gaetano D. Maccarone

[57]  ABSTRACT

There is disclosed an imaging system for forming a plurality of images on the same surface. The imaging system includes an electro-optic imaging member comprising a voltage or current-sensitive light modulating layer, a layer of photoconductive material which exhibits persistent photoconduction properties and a layer of material capable of generating photoinjection currents when struck by radiation which it absorbs.

37 Claims, 4 Drawing Figures

IMAGING SYSTEM

BACKGROUND OF THE INVENTION

This invention relates generally to an imaging system for forming a plurality of images and, more specifically, to such a system which includes an electrooptic imaging member.

There is known in the imaging art a broad class of imaging devices which record optical images by an imagewise distribution of photogenerated voltages or currents acting upon a voltage or current-alterable recording medium. Examples of imaging devices which belong to this class are the Ruticon devices, FERPIC devices, Phototitus devices and liquid crystal devices. Typically, in these devices, imagewise activating radiation incident on a photoconductor allows charge carriers to move in an external electric field. These charge carriers interact with a voltage or current-sensitive member which, in turn, modulates light.

In the Ruticon (derived from the Greek words "rutis" for wrinkle and "icon" of image) family of devices described by Sheridon in *IEEE Transactions on Electron Devices*, September, 1972, and U.S. Pat. No. 3,716,359, the voltage-sensitive, light modulating recording medium comprises a deformable elastomer layer and the photoconductive material may be provided as a separate layer or incorporated in the elastomer layer. Various embodiments for establishing an electric field across the elastomer layer are possible including depositing a thin metallic conductive layer which serves as an electrode over the elastomer layer in the embodiment referred to as the γ-Ruticon.

The Phototitus devices, described by Grenat, Pergrale, Donjon and Marie, *Applied Physics Letters*, Vol. 21, No. 3, Aug. 1, 1972, have sandwich structures comprising a $KD_2PO_4$ crystal as the voltage-sensitive, light modulating layer arranged adjacent to a photoconductive layer. The $KD_2PO_4$ crystal reacts to the light-induced voltage distribution produced by the photoconductive layer by changing the polarization of transmitted light, a phenomenon called the electro-optic effect or the Pockels effect.

The FERPIC devices, which are described, for example, by Meitzler and Maldonado in *Electronics*, Feb. 1, 1971, and by Smith and Land in *Applied Physics Letters*, Vol. 24, No. 4, Feb. 15, 1972, include a PLZT (lead-zirconate titanate doped with Lanthanum) ceramic material as the voltage-sensitive, light modulating element. Like the $KD_2PO_4$ crystal in the Phototitus devices, the PLZT ceramic material responds to the altered electric field produced by the photoconductive layer by changing the polarization of transmitted light. In some PLZT devices, the effect used is an electric field-induced change in the degree to which transmitted light is scattered. Unlike the $KD_2PO_4$ crystals, the effects produced in the PLZT ceramics do not disappear when the electric field is removed. Because of their similarities, the materials used in the Phototitus and FERPIC devices will be referred to herein as "electrooptic effect materials."

Many imaging devices in which liquid crystalline materials are used as the recording medium are known such as, for example, those described by Margerum et al, *Applied Physics Letters*, Vol. 19, No. 7, Oct. 1, 1971. In these devices, the light modulating liquid crystal layer may be either voltage or current alterable. For example, devices which include nematic liquid crystalline materials as the recording medium display voltage-sensitive light modulating properties when operated above a certain threshold voltage. Various nematogenic materials will also exhibit dynamic scattering when acted upon by an electric current.

Electrooptic imaging devices of this general type have been the subject of increasing attention recently because of the many applications in which they may be utilized and the excellent performance which they are capable of providing. Two important areas where devices of this type may be effectively utilized are image intensification and image storage. In relatively new and growing areas of technology such as electrooptic imaging systems, new imaging members, materials for use in the imaging members and the use of the imaging members in new modes continue to be discovered. The present application relates to a novel and advantageous imaging system for forming a plurality of images on the same surface.

SUMMARY OF THE INVENTION

It is therefore an object of the invention to provide a novel electrooptic imaging system.

It is another object of the invention to provide a method for forming a plurality of images on a recording medium.

It is a further object of the invention to provide an imaging method in which a plurality of images is formed in an electrooptic imaging member.

Still another object of the invention is to provide such an imaging method which is capable of operating in a recyclable mode and wherein at least one image comprises permanent information and at least one image comprises variable information.

Yet another object of the invention is to provide such an imaging method wherein the variable image information is supplied in a real-time mode.

The foregoing and other objects and advantages are accomplished in accordance with the present invention by providing an electrooptic imaging member comprising a voltage or current-sensitive light modulating layer adjacent a layer of a photoconductive material which exhibits persistent photoconductive properties which, in turn, is adjacent to a layer of a material which is capable of generating photoinjection currents when struck by radiation which it absorbs. In operation of the method, generally speaking, an electric field is applied across the imaging member and the photoconductive layer is exposed to a first imagewise pattern of a radiation to which it is sensitive thereby creating a corresponding imagewise pattern in or on the voltage or current-sensitive, light modulating layer. The photoinjecting material layer is subjected to exposure to a second imagewise pattern of radiation which it absorbs thus effecting the generation of photoinjection currents in the areas receiving radiation. The photoinjection currents move into the photoconductive layer, thus rendering those areas conductive and causing a corresponding second imagewise pattern to be formed in or on the voltage or current-sensitive, light modulating layer.

Because of the properties of the photoconductive material, it does not simultaneously return to the insulating condition upon removal of the imagewise radiation to which it is sensitive but rather remains conductive, in the areas struck by radiation, for some period of time afterwards. Hence, the first imagewise pattern can be created at will in the voltage or current-sensitive light modulating layer for the duration of the persistent conductive state without the need for additional exposure to that imagewise pattern of radiation. The photoinjection currents, on the other hand, do not give rise to persistent photoconduction and decay simultaneously with the removal of the second imagewise pattern of radiation. It will be apparent, therefore, that the imaging system of the present invention is particularly suitable for combining permanent image information with the variable image information such as where it is desired to reproduce different individual information on different copies of the same basic form.

BRIEF DESCRIPTION OF THE DRAWINGS

For a better understanding of the invention as well as other objects and further features thereof, reference is made to the following detailed disclosure of various preferred embodiments of the invention taken in conjunction with the accompanying drawings thereof wherein.

DESCRIPTION OF PREFERRED EMBODIMENTS

Figure 1:
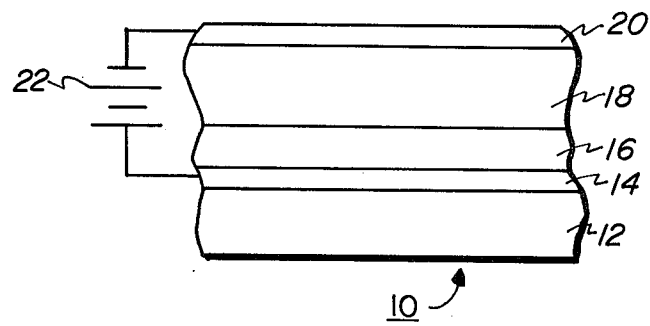
FIG. 1 is a partially schematic, cross-sectional view of an embodiment of an imaging member according to the invention.

FIG. 1 illustrates an imaging member utilized in the imaging system of the invention. Referring now to FIG. 1, there is seen the imaging member, generally designated 10, which comprises optional substrate 12, photoinjecting layer 14, photoconductive layer 16, voltage or current-sensitive, light-modulating layer 18 and surface charging means, shown here as a conductive layer 20 connected to one side of a source of electrical potential 22 which may be A.C., D.C., or a combination thereof. The external circuit may also include suitable switching means (not shown). Of course, it will be appreciated that conductive layer 20 may be eliminated when the electric field is established by means of corona charging such as where corona charging means, for example, those disclosed in U.S. Pat. Nos. 2,777,957 and 2,836,725, are used to deposit charge on the surface of layer 18 while the other side of the imaging member is grounded. Alternatively, the field across the imaging member may be established by the double sided corona charging technique wherein one corona charging device is arranged on each side of the imaging member. Typically, the corona charging devices are oppositely charged in this embodiment and are traversed more or less in register. It should be noted that it is possible to have a substrate in the imaging member when the field is established in this manner in which case, it need not be laterally conductive.

Optional substrate 12 may comprise any suitable material possessing the requisite mechanical properties and may be transparent or opaque depending upon what materials are used in the imaging member and how the imaging member is used. In embodiments where an electrically conductive substrate is used, the substrate may be a single layer of conductive material or it may comprise a transparent conductive layer arranged on a suitable substrate such as, for example, glass or plastic materials. Typical suitable transparent conductive layers include continuously conductive coatings of conductors such as indium oxide, tin oxide, thin layers of tin, aluminum, chromium or any other suitable conductors. These substantially transparent conductive coatings are typically evaporated or sputtered onto the more insulating transparent substrate. NESA glass, a tin oxide coated glass manufactured by the Pittsburgh Plate Glass Company, is a commercially available example of a typical transparent conductive layer coated over a transparent substrate. It should be noted here that conductive layer 20 may comprise any of the above described materials. It is preferred to have a substrate in the imaging member because it provides mechanical support for the other layers in the member.

Photoinjecting layer 14 may comprise any materials which will generate photoinjection currents when struck by radiation which it absorbs and inject these currents into the adjacent photoconductive layer 16 so as to alter the electrical conductivity characteristics of the photoconductive material. Typical suitable photoinjecting materials for use in layer 14 include metals such as gold, copper, aluminum, silver, indium, chromium and mixtures thereof. It is preferred to employ a material which is transparent at thicknesses at which it is conductive since, in some embodiments of the invention, exposure of the photoconductor is effected through the substrate. It will be understood, however, that layer 14 may be opaque in which case layer 18 should be transparent to allow activating radiation to reach photoconductive layer 16. The photoinjecting layer 14 is typically from about 50A to about 400A thick and typically has a work function of from about 4 to about 6 eV. The preferred thickness of layer 14 in any particular embodiment of imaging member 10 depends, inter alia, upon the range of excited electrons or holes generated in the metal. This range will also determine the conductivity requirement. The preferred work function for layer 14 is dependent, inter alia, upon the position of the energy levels of the conducting electrons and holes in the particular persistent photoconductor which comprises layer 16. It is preferred to utilize a photoinjecting material which absorbs radiation to which the photoconductive material is not sensitive since in such an embodiment care need not be taken to prevent the second imagewise pattern of radiation from reaching the photoconductive layer. It should be noted that the imagewise exposure pattern which is used to generate the photoinjection currents in layer 14 according to the invention may comprise wavelengths to which the photoconductive material is sensitive if layer 14 is capable of preventing the radiation from reaching photoconductive layer 16; however, it is preferred that this exposure pattern comprise wavelenghts to which photoconductive layer 16 is not substantially sensitive. Typically, energy in the range of from about $10^4$ to about $10^5$ ergs/cm$^2$ is required to generate photoinjection currents which are of sufficient strength to discharge the photoconductor.

Photoconductive layer 16 may comprise any photoconductive insulating material which exhibits persistent photoconduction properties and may be organic, inorganic or mixtures thereof. Typical suitable persistent photoconductive materials include, for example, those described in U.S. Pat. Nos. 3,114,022 and 3,512,966. A preferred class of persistent photoconductive materials comprises an organic photoconductive material, an activator capable of formation of a charge transfer complex with said organic photoconductive material and a protonic acid. These photoconductive compositions can be used as either a rapidly switching or persistent imaging layer depending upon the degree of exposure given to them. The preferred compositions of this class of materials have a strong tendency toward this elevated state of conductivity and can be restored to a relatively insulative condition by subjecting the composition to heat.

Organic photoconductive electron donor materials which can be used in preparation of the photoconductive compositions of the present invention include what can be termed "small molecule" photoconductors dispersed in an inert cohesive matrix and any of a number of the polymeric photoconductive materials.

These so-called "small molecule" photoconductive materials include the following: oxadiazoles; e.g., 2,5-bis[4'-diethylaminophenyl]-1,3,4-oxadiazole, 2,5-bis-[4'-(n-propylamino)-2'-chlorophenyl-(1')]-1,3,4-oxadiazole, 2,5-bis-[4'-N-ethyl-N-n-propylaminophenyl-(1')]-1,3,4-oxadiazole, 2,5-bis-[4'-dimethylaminophenyl]-1,3,4-oxadiazole; triazoles, e.g., 1-methyl-2,5-bis-[4'-diethylaminophenyl]-1,3,4-triazole; imidazoles, e.g., 2-(4'-dimethylaminophenyl)-6-methoxy-benzimidazole; oxazoles, e.g., 2-(4'-chlorophenyl)-phenanthreno-(9'-10':4,5)-oxazole; thiazoles, e.g., 2-(4'-diethylaminophenyl)-benzthiazole; thiophenes, e.g., 2,3,5-triphenylthiophene; triazines, e.g., 3-(4'-aminophenyl)-5,6-dipyridyl-(2')-1,2,4-triazine, 3-(4'-dimethylaminophenyl)-5,6-di(4'-phenoxyphenyl)-1,2,4-triazine; hydrazones, e.g., 4-dimethylaminobenzaldehyde isonicotinic acid hydrazone; styryl compounds, e.g., 2-(4'-dimethylaminostyryl)-6-methyl-4-pyridone, 2-(4'-dimethylaminostyryl)-5-(or 6)-aminobenzimidazole, bis (4-dimethylaminostyryl) ketone; azomethines, e.g., 4-dimethylaminobenzylidene--naphthylamine; acylhydrazones, e.g., 4-dimethylaminobenzylidenebenzhydrazine, 4-dimethylaminobenzylidene-4-hydroxybenzoic hydrazide, 4-dimethylaminobenzylidene-2-aminobenzoic hydrazide, 4-dimethylaminobenzylidene-4-methoxybenzoic hydrazide, 4-dimethylaminobenzylidene-iso-nicotinic hydrazide, 4-dimethyl-aminobenzylidene-2-methylbenzoic hydrazide; pyrazolines, e.g., 1,3,5-triphenyl-pyrazoline, 1,3-diphenyl-5-[4'-methoxy-phenyl]-pyrazoline, 1,3-diphenyl-5]4'-dimethylaminophenyl] pyrazoline; 1,5-diphenyl-3-styrylpyrazoline; 1-phenyl-3]4'-dimethylaminostyryl]-5-[4'Odimethylamino-phenyl]-pyrazoline; imidazolones, e.g., 4-[4'-dimethylaminophenyl]-5-phenylimidazolone, 4-furfuryl-5-phenylimidazolone; imidazolethiones, e.g., 4-[4'-dimethylaminophenyl]-5-phenylimidazolethione, 3,4,5-tetraphenylimidazolethione; 1,3,5-triphenyl-4-[4'-dimethylaminophenyl] imidazolethione; 1,3,4-triphenyl-5-, furfurylimidazolethione; benzimidazoles, e.g., 2-[4'-dimethylaminophenyl]-benzimidazole, 1-methyl-2-[4'-dimethylaminophenyl]-benzimidazole, 1-phenyl-2-[4'-dimethylaminophenyl]-benzimidazole; benzoxazoles, e.g., 2-[4'-dimethylaminophenyl]-benzoxazole; and benzothiazoles, e.g., 2-[4'-dimethylaminophenyl]-benzoxazole; and benzothiazoles, e.g., 2-[4'-dimethylaminophenyl]-benzothiazole.

Materials which can be effectively used to provide the inert cohesive matrix for dispersion of the above "small molecule" photoconductors are polymers having fairly high dielectric strength and which are good electrically insulating film forming vehicles. Typical of such inert polymer matrices are: styrene-butadiene copolymers; silicone resins, styrene-alkyd resins; soya alkyd resins; polyvinyl chloride; polyvinylidene chloride; vinylidene chloride-acrylonitrile copolymers; polyvinyl acetate; vinyl acetate-vinyl chloride copolymers; polyvinyl acetals, such as polyvinyl formal; polyacrylic and methacrylic esters, such as polymethyl methacrylate, poly-n-butyl methacrylate, polyisobutyl methacrylate; polystyrene; nitrated polystyrene; polymethylstyrene; isobutylene polymers; polyesters, such as polyethylene-alkaryl-oxyalkylene terephthalate; phenol-formaldehyde resins; ketone resins; polyamide; and polycarbonates. Methods of making resins of this type have been described in the prior art, for example, styrene-alkyd resins can be prepared according to the method described in U.S. Pat. Nos. 2,361,019 and 2,258,423.

Typical polymeric photoconductive materials suitable for use in preparation of such photoconductive compositions include: poly-N-acrylylphenothiazine, poly-N-($\beta$-acrylyloxyethyl)-phenothiazine, poly-N-(2-acrylyloxy propyl)-phenothiazine, polyallylcarbazole, poly-N-(2-acrylyloxy-2-methyl-N-ethyl) carbazole, poly-N-(2-p-vinylbenzoyl-ethyl)-carbazole, poly-N-propenylcarbazole, poly-N-vinyl-carbazole, poly-N-2-meth-acrylyl-oxypropyl carbazole, poly-N-acrylyl-carbazole, poly-(N-ethyl-3-vinylcarbazole), poly-4-vinyl-p-(N-carbazyl)-toluene, poly(vinylanisal acetophenone), poly(vinylpyrene) and polyindenes. If desired, the monomers of the polymeric photoconductors can be copolymerized with each other or with other monomers, such as vinyl acetate, methylacrylate, vinylcinnamate, polystyrene, 2-vinylpyridine.

The photoresponsiveness of the above photoconductive materials are enhanced with respect to speed and spectral response by the addition thereto of any of a number of standard activators (electron acceptors) and, optionally, any one of a number of dyestuff sensitizers. The quantity of activator in the photoconductive compositions will vary depending upon the level of enhancement of conductivity desired and the effect such inclusions have on the physical properties of the composition. Generally, the amount of activator present in the photoconductive composition will range from about 0.1 to 50.0 weight percent based upon the weight of the photoconductive material, with 1–6 weight percent ordinarily being preferred. The quantity of dyestuff sensitizer that can be optionally added to the composition is similarly limited. Representative of activators which can be added to these compositions include nitrobenzene, m-dinitrobenzene; o-dinitrobenzene; p-dinitrobenzene; 1-nitro-naphthalene; 2-nitronaphthalene; 2,5-dinitrophenaphthrenequinone; 2,7-dinitrophenaphthrenequinone; 3,6-dinitrophenaphthrenequinone; 2,4-dinitrofluorene-$\Delta^{9,\alpha}$-malonotrile; 2,5-dinitrofluorene-$\Delta^{9,\alpha}$-malononitrile; 2,6-dinitrofluorene-$\Delta^{9,\alpha}$-malononitrile; 2,7-dinitrofluorene-$\Delta^{9,\alpha}$-malononitrile; 3,6-dinitrofluorene-$\Delta^{9,\alpha}$ malononitrile; 2,4,7-trinitrofluorene-$\Delta^{9,\alpha}$ -malononitrile; 2,4,5,7-tetronitrofluorene-$\Delta^{9,\alpha}$ -malononitrile; 2,4-dinitrofluorenone; 2,5-dinitrofluorenone; 2,6-dinitrofluorenone; 2,7-dinitrofluorenone; and 2,4,7-trinitro-9-fluorenone. Especially preferred activators of the type described above are the nitroaromatics. Examples of dyestuff sensitizers suitable for incorporation in the photoconductive compositions of this invention are the triarylmethane dyestuffs such as Malachite Green, Brilliant Green, Victoria Blue B, Methyl Violet, Crystal Violet, Acid Violet 6B; xanthene dyestuffs, namely rhodamines, such as Rhodamine B, Rhodamine 6G, Rhodamine G Extra, and Fast Acid Eosin G, as also phthaleins such as Eosin S, Eosin A, Erythrosin, Phloxin, Rose Bengal, and Fluorescein; thiazine dyestuffs such as Methylene Blue; acridine dyestuffs such as Acridine yellow, Acridine Orange and Trypaflavine; and cyanine dyestuffs such as Pinacyanol, Cryptocyanine and Cyanine.

The protonic acids which can be used in extending the conductivity of the photoconductive compositions of this invention can be any proton donor having an aqueous dissociation constant of $10^{-4}$ and preferably greater. The upper concentration of acid relative to the photoconductive material is only limited by the solubility of such material in the photoconductive composition. Good results have been obtained utilizing as little as about 0.004 weight percent acid based upon the combined weight of the essential components of the photoconductive composition. In the preferred embodiments of this invention the acid concentration will range from about 0.1 – 4 weight percent.

Typical of the acids which can be used in the photoconductive compositions of this invention are: naphthalinesulfonic acid, benzosulfonic acid, o-aminobenzosulfonic acid, p-aminobenzosulfonic acid, m-aminobenzosulfonic acid, iodoacetic acid, bromoacetic acid, dichloroacetic acid, trichloroacetic acid, dichloroacetylacetic acid, dimethylmalonic acid, dinicotinic acid, fluorobenzoic acid, o-hydroxybenzoic acid, litidinic acid, maleic acid, malonic acid, oxalic acid, quinolinic acid, α-tartaric acid, phosphoric acid and sulfurous acid.

A preferred persistent photoconductive composition for use according to the present invention comprises poly-n-vinylcarbazole, o-dinitrobenzene and trichloroacetic acid. Both the essential and optional ingredients used in preparation of the herein disclosed photoconductive compositions are presently commercially available or can be prepared by well-known chemical synthesis.

The photoconductive compositions can be prepared by dispersal of the above ingredients in their appropriate proportion in a suitable dispersal medium, forming a film of the dispersal on photoinjecting layer 14 and thereafter evaporation of the dispersant. The liquid dispersal can be applied to the photoinjecting layer by any of a number of standard coating techniques. Film thickness is controlled by either adjustment of the viscosity of the dispersal or by mechanical means or both. The films thus produced form a substantially uniform, continuous and adherent coating on the conductive substrate. Ordinarily, an average film thickness of about 1 to about 50 microns will provide an imaging layer of the requisite insulative and photodischarge characteristics to be suitable for imaging according to the system of the present invention.

Liquid dispersal media suitable for use in preparation of coatings of these photoconductive compositions include benzene; toluene; acetone; 2-butanone; chlorinated hydrocarbons, e.g., methylene chloride, ethylene ethers, e.g., tetrahydrofuran, and mixtures thereof.

Voltage or current-sensitive, light modulating layer 18 may comprise any suitable material which is capable of recording optical images by an imagewise distribution of photogenerated voltages or currents. Typical suitable materials include, for example, elastomers, liquid crystalline materials, electro-optic effect materials (such as Pockels effect crystals and PLZT ceramics), electrophoretic materials (charged particles in dielectric liquids), thermoplastics and movable segmented films such as are disclosed by J. A. VanRaalte in *J. Opt. Soc. Am.*, Vol. 9, No. 10, pp. 22–25, 1970, and K. Preston in *Opt. Acta.*, Vol. 16, p. 579, 1970.

In operation, an electric field is applied across imaging member 10 and the member is exposed to a first imagewise pattern of activating electromagnetic radiation to which the photoconductive material comprising layer 16 is sensitive, therey rendering conductive those areas of layer 16 which receive radiation and establishing an imagewise pattern in or on voltage or current-sensitive, light modulating layer 18. The voltage drop across the photoconductive layer-light modulating layer sandwich is typically in the range of from 0.1 volt to about 25,000 volts depending upon the material which comprises light modulating layer 18, the thickness of the layers and certain properties of the photoconductive material, the dielectric constant in particular. The imaging member 10 is also subjected to exposure to a second imagewise pattern comprising electromagnetic radiation which is absorbed by photoinjecting layer 14. Photoinjection currents are generated in those areas of layer 14 which receive activating radiation and these currents are injected into photoconductive layer 16 causing the affected areas of layer 16 to become conductive and resulting in a second imagewise pattern being established in or on voltage or current-sensitive, light modulating layer 18.

The respective image information may be directed upon the imaging member through the upper surface thereof or through the substrate depending, inter alia, upon the properties of the various layers of the imaging member, the particular voltage or current-sensitive, light modulating material employed and the nature of the activating radiation comprising the image information. For example, if the activating radiation comprising the second imagewise pattern is not absorbed by photoconductive layer 16, then it can be directed at the imaging member from above as could the first imagewise pattern of radiation. Of course, in this embodiment, layers 18 and 20 would have to allow the respective imagewise radiation pattern to reach layers 14 and 16. Alternatively, exposure to the second imagewise radiation pattern could be effected directly onto photoinjecting layer 14 from below or through substrate 12, if present. Of course, it will be recognized that the present method is intended to be practiced preferably in a manner such that registration of the respective imagewise patterns projected upon the imaging member will preclude any overlap in the image patterns formed in or on layer 18 and, consequently, on any hard copy reproductions or visual displays these patterns formed therefrom. However, it should be noted that some overlap may occur without substantially affecting the results obtained. With respect to the reproduction of line copy which typically comprises the bulk of the copy reproduced, substantial areas of the original material are comprised of background. For example, a U.S. patent on pages completely filled with single space information has a background area of about 90% with about 10% of the total imaging area of the page taken up by character information. Thus, it will be clearly evident that any overlap between, for example, character information and a standard form could be tolerated and would not present any significant problems in the practice of the invention. It should also be noted that the respective images formed in the imaging member according to the invention may be in side-by-side relationship, that is to say, where one image is formed be exposing a first portion of the photoconductor and a second image is formed by exposing a second portion of the photoconductor which does not overlap the first exposed portion. Thus, it will be understood that the method of the invention broadly contemplates forming a plurality of images in an imaging member and the plurality of images may have any relative position to each other within the imaging area of the member.

The imagewise patterns formed in or on voltage or current-sensitive, light modulating layer 18 may be read out by various techniques depending upon, inter alia, the particular type of voltage or current-sensitive light, modulating layer present in the imaging member. Generally, the imagewise patterns may be read out in reflection or in the transmission. Image enhancement means such as polarizers may also be utilized in reading out the images. Such image enhancement means are preferred when birefringence effects in the light modulating layer 18 are exploited to form the images therein. In embodiments where light modulating layer 18 comprises a deformable material such as an elastomer and deformation images are formed it is preferred to employ a phase sensitive image reconstruction system such as a Schlieren optical system.

After removal of the first imagewise pattern of radiation, the areas of the photoconductive layer which received such radiation do not simultaneously return to the original electrically insulating condition but instead remain in the electrically conductive state for an extended period of time, for example, up to about $10^3$ to about $10^4$ seconds or more. Moreover, in an electroded configuration such as is illustrated in FIG. 1, this persistent conductivity is typically not depleted by high electric fields such as may be utilized in the imaging method. Hence, the imagewise pattern created in or on light modulating layer 18 may be recalled at will for the duration of the persistent conductive state. Within this time period, the first imagewise pattern can be erased permanently from the imaging member typically by heating the photoconductive layer to elevated temperatures for a few seconds. In the case of the preferred photoconductive composition comprising poly-n-vinylcarbazole, o-dinitrobenzene and trichloroacetic acid, heating to a temperature of from about 80°C to about 120°C for about 60 seconds is typically required to permanently erase the image.

As noted previously, the photoinjection currents generated as a result of the second imagewise pattern of radiation being absorbed by photoinjection layer 14 and which are injected into photoconductive layer 16 do not give rise to persistent photoconduction. These photoinjection currents decay simultaneously with removal of the exposing radiation from the imaging member. Hence, the imaging member will function in a normal erasable or real time mode when operated with the photoinjection currents. It is possible, therefore, according to the present invention to add quickly erasable, variable information to the relatively more permanent information. This technique would be highly advantageous in situations where it is desired to reproduce particular image information a great number of times in combination with different additional image information such as, for example, in commercial billings or inventories where a single basic form is reproduced many times with different individual information added for each reproduction. If the persistent conductive state of the photoconductor remains for from $10^3$ to $10^4$ seconds and one reproduction per second is made then from 1000 to 10,000 reproductions may be made with only one exposure of the imaging member to the permanent image information.

As noted above, potential source 22 and may be A.C., D.C. or combinations thereof. The potential source 22 should be capable of being turned off to more rapidly erase the images formed as a result of the photoinjection currents or undergo a shift in polarity to accomplish the same.

The invention has been described with respect to a general imaging member. It will not be further described in detail with respect to various preferred embodiments of imaging members and it should be understood that various specific elements in addition to those illustrated in FIG. 1 may be required in these various embodiments.

Figure 2:
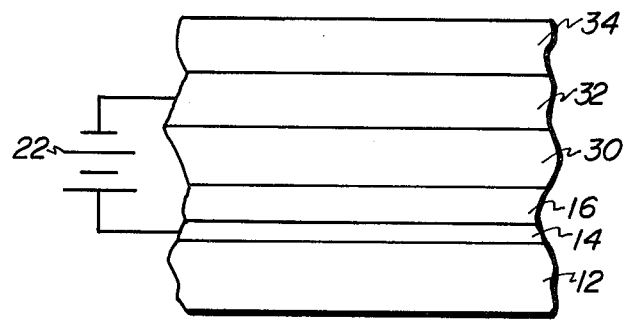
FIGS. 2, 3, and 4 are partially schematic, cross-sectional views of imaging members according to the invention wherein the light modulating layer comprises a deformable elastomer material.
Figure 3:
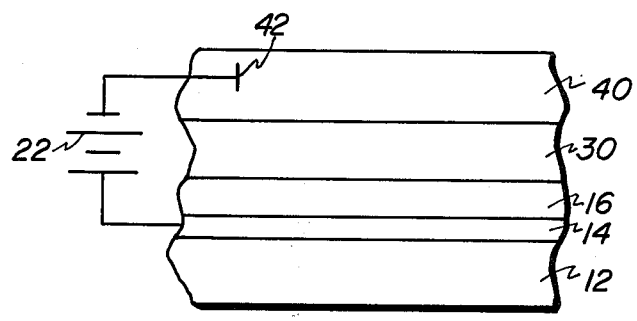
Figure 4:
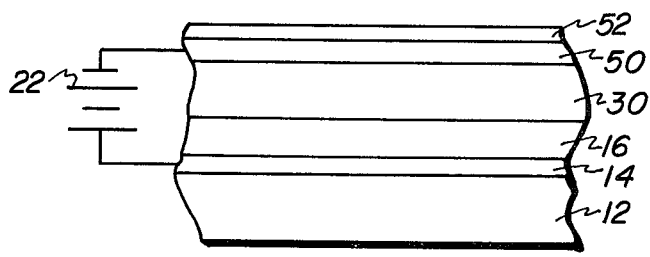

Particularly preferred imaging members according to the present invention are those wherein the voltage or current-sensitive light modulating layer comprises a deformable elastomer material. It should be understood that by the term "elastomer" is meant a usually amorphous material which exhibits a restoring force in response to a deformation, that is, an amorphous material which deforms under a force and, because of volume and surface forces, tends to return to the form it had before the force was applied. A detailed description of imaging members including a deformable elastomer layer is found in U.S. Pat. No. 3,716,359. FIGS. 2, 3 and 4 illustrate embodiments of imaging members including a deformable elastomer layer. These imaging members are similar to the member illustrated in FIG. 1 and like elements are identified by the same numerals.

FIG. 2 illustrates an imaging member wherein a layer of a conductive liquid serves as one of the electrodes. In this embodiment, voltage sensitive light modulating layer 30 comprises a deformable elastomer material. Any suitable elastomer material may be used to form layer 30. Typical suitable elastomeric soft solid materials for use in the imaging devices of the invention include both natural (such as natural rubber) and synthetic polymers which have rubber-like characteristics, i.e., are elastic, and include materials such as styrene-butadiene, polybutadiene, neoprene, butyl, polyisoprene, nitrile, urethane and ethylene rubbers. A preferred class of elastomer materials includes water based gelatin gels and dimethylpolysiloxane gels. The elastomers generally should be reasonably good insulators and typically have volume resistivities above about $10^4$ ohm-cm and shear moduli of from about 10 to about $10^8$ dynes/cm$^2$ and dielectric strengths above about 10 volts/mil. Preferably, the elastomers will have volume resistivities above about $10^{13}$ ohm-cm, shear moduli of from about $10^2$ to about $10^5$ dynes/cm$^2$ and dielectric strengths greater than about 500 volts/mil. Commercially available elastomers which have been found to be suitable for use include: Sylgard 182, Sylgard 184, Sylgard 188 (available from Dow Corning Co.), RTV 602 and RTV 615 (available from General Electric Co.). The higher volume resistivity elastomers are preferred since they typically provide extended image storage capability. Elastomers having relatively high dielectric strength are preferred because they typically allow the imaging members to be operated at relatively high voltage levels which is desirable.

A particularly preferred elastomer is a transparent, very compliant composition which comprises an elastomeric dimethylpolysiloxane gel made by steps including combining about one part by weight of Dow Corning No. 182 silicone resin potting compound, about 0.1 part by weight of curing agent and anywhere from about zero to about thirty parts by weight of Dow Corning No. 200 dimethylpolysiloxane silicone oil. Other suitable resins include transparent flexible organosiloxane resins of the type described in U.S. Pat. No. 3,284,406 in which a major portion of the organic groups attached to silicon are methyl radicals.

The thickness of elastomer layer 30 is typically in the range of from about 0.1 micron to about 200 microns depending, inter alia, upon the spatial frequency of the information to be recorded. It is preferred that elastomer layer 30 be from about 5 to about 10 microns thick. Various optical properties of the imaging device may be enhanced by a suitable selection of the elastic modulus of the particular elastomer material used. For example, a relatively more stiff elastomer will typically recover more rapidly from an image when the electric field is removed and thus may be erased more quickly. On the other hand, an elastomer material having a relatively low elastic modulus will exhibit less resistance to large deformations and hence greater optical modulation for a given value of electric field.

The thick conductive liquid layer 32 may or may not be transparent. Non-transparent conductive fluids include mercury, room temperature molten gallium-indium alloys, etc. Transparent conductive fluids include water to which conductive impurities have been added. When transparent, fluid 32 should typically have a substantially different refractive index than elastomer 30 in order that deformations of the elastomer surface will phase modulate the illuminating light. A transparent fluid may also be used for read out in the reflection mode which may be enhanced by arranging a thin, flexible, transparent layer on elastomer layer 32. Such a flexible, transparent layer should typically have a substantially different refractive index than either the elastomer layer 30 or the transparent conductive fluid.

Window layer 34 may be any suitable material such as, for example, normal optical property glass, which is capable of maintaining conductive fluid 32 in contact with elastomer layer 30. It should be noted that many conducting transparent fluids typically undergo electrolysis in a D.C. electric field. This is undesirable because it leads to a deterioration of the elements of the imaging device as well as evolution of gas. Thus, in operation of imaging devices including conductive transparent fluids, it is typically preferred to use an A.C. electric field. Of course, it will be recognized that the image information may be projected upon the imaging member, and the image patterns may be read out, by any of the techniques described above herein.

In operation a field created by voltage from potential source 22 is applied across the imaging member and exposure to the first and second imagewise patterns of radiation is effected. The electric field across the elastomer layer 30 is varied in a manner corresponding to the first and second imagewise radiation patterns. The mechanical force of the electric field across the elastomer layer causes it to deform and this deformation will proceed until the forces of the electric field are balanced by the surface tension and elastic forces of the elastomer. At this point, the deformation stops and typically becomes stable as long as the electric field across the elastomer is maintained. To erase the images, the field across the elastomer is removed. In a preferred embodiment, erasure is effected by reversing the polarity of the field across the elastomer layer, this technique typically providing more rapid erasure. With some photoconductors, rapid erasure requires flooding the photoconductor with uniform activating radiation.

It should be noted that the deformations in elastomeric materials are different from those occurring in thermoplastic materials in that elastomer deformations are independent of any developing step such as heat and/or solvent softening steps typically necessary with thermoplastic deformation imaging materials. Another difference between elastomers and thermoplastics is that deformations in the former assume a definite llimit for a given electric field because elastic forces oppose the deformation. The thermoplastic deformations do not encounter such a definite limit for a given field as long as the thermoplastic is maintained in a softened condition.

Although not illustrated, it should be recognized that according to a preferred embodiment of the invention, an absorption type line grating is arranged between the projected imagewise radiation and the photoconductor of the imaging member. The line grating allows the elastomer layer to record images having spatial frequencies substantially lower than the resonant deformation frequency of the elastomer. The elastomer will deform along the pattern of the high spatial frequency screen in those areas where it is illuminated. The screened surface relief imaging formed on the elastomer will be made up of segments of the shadow of the screen. The image obtained when the deformed elastomer is illuminated will therefor have a fine structure of lines superimposed upon the original image that was recorded. If the line structure is objectionable, it may be removed by suitable optical filtering techniques which are well-known in the art.

It is preferred to place the screen (for example, a line grating) immediately adjacent to the photoconductive layer in the imaging device. Other types of screens that may be used and, if desired, similarly located are described in U.S. Pat. Nos. 3,698,893 and 3,719,483. It should be noted here that screens may be incorporated in any of the devices constructed according to the present invention, where appropriate.

In another embodiment it is possible to create a screen pattern in the photoconductor by optical techniques. For example, the photoconductive layer can be exposed to uniform illumination to which it is sensitive through a line grating and hence a persistent conductivity pattern corresponding to the screen will be formed in the layer. The photoinjecting layer can then be irradiated with an imagewise pattern comprising suitable wavelengths and there will consequently be formed in the imaging member a screened reproduction of the imagewise pattern. The image formed in this manner typically would be of higher resolution than one formed in a member which included an integral line grating since in the former there would be no replication of the screen grating. It should also be noted that the imaging member could include two or more different color gratings in which case the member could be used in a multicolor image reproduction system.

FIG. 3 illustrates an imaging member according to the invention wherein a layer of conductive gas serves as one of the electrodes. The embodiment is essentially identical with that illustrated in FIG. 2 with the exception that the thick conductive liquid layer 32 in FIG. 2 is replaced by a conductive gas 40 and requires means for ionizing the gas 42 which may include a transparent conducting window. The conductive gas 40 may be obtained by means of glow discharge through a low pressure gas of a few millimeters of mercury pressure, or by low pressure arc discharge which commonly takes place at a few microns of mercury pressure. The gas may also be ionized by means of intense radioactivity in or near a low pressure gas 40 or radio frequency excitation of the gas in the cavity or other techniques for producing a conductive gaseous plasma which are well-known in the art. Charging of the elastomer surface may also take place if gas 40 is at a sufficiently high vacuum and contains a source of thermally excited electrons, such as a heated tungsten filament, which is directed against the elastomer surface. This may be a scanned beam as from an electron gun, or an unscanned beam, or from a multiplicity of electron emitting sources. A reflective layer may also be placed over layer 30 on the surface interface between layers 30 and 40. The conductive gas layer 40 may be between 0.1 micron thick to an indefinite thickness. As set forth above, gas ionizing means 42 may be a separate electrode or may be coupled to a transparent conducting window to contain the conductive gas against elastomer layer 30. The container for preventing the conductive gas 40 from escaping would, of course, have to be airtight to contain the gas at the necessary level of vacuum.

FIG. 4 illustrates a particularly preferred embodiment of a Ruticon imaging device wherein the electric field is created across the elastomer layer 30 by means of a thin, continuous conductive layer 50 on the surface of the elastomer, which layer is sufficiently flexible to follow the deformations of the elastomer. In the case where this layer 50 is highly reflective, this apparatus will utilize the readout light with great efficiency. If the layer is opaque, light propagating through the substrate may be used to form the surface deformation images while simultaneously light propagating from above may be used to reconstruct the image. The light sources used may be of different wavelengths and/or intensities and/or one light source may be coherent and the other non-coherent. Hence, this device may be used to convert imaged formed in particular wavelengths into equivalent images formed in different wavelengths. Also, if the readout light incident from the top is very much more intense than the imaging light incident from the bottom, the apparatus shown in FIG. 4 will provide great amplification of input images such as amplified light being used, for example, for large panel displays. Furthermore, the reconstruction light may be coherent, e.g., that produced by a laser, so that image processing steps may be performed on the surface deformation images which are formed with non-coherent light propagating from the bottom. On the other hand, the light giving rise to the surface deformation images may be coherent light while the reconstruction light may be non-coherent. This latter case is desirable because non-coherent light is more pleasing to the human eye and current coherent light generators are typically limited to production of light within narrow wavelength bands, i.e., one color such as red. A reason for having coherent light for forming the surface deformation images arises when it is the reconstruction light for forming images with holograms. Therefore, the present device may have a holographically reconstructed image projected onto it forming a surface deformation image that is viewed with non-coherent light of substantially greater intensity as suited for large panel displays.

It is again noted that substrate 12 may be opaque or transparent. The thin conductive layer 50 typically should be flexible enough to follow the deformations of elastomer layer 30. Where, for example, conductive layer 50 is opaque, such as a thin metal film, substrate 12 and photoinjecting layer 14 must be transparent to allow the first imagewise radiation pattern to reach photoconductive layer 16. In this case image information may be read out continuously when the readout illumination is incident from above the member. Where the thin conductive layer 50 is transparent, readout light may be reflected from its surface of the member may be used in transillumination provided the other layers are transparent.

Conductive layer 50 may comprise a thin layer of a suitable metal material or combination of two or more metals. such metallic layers would typically be between approximately 50 angstroms to several thousand angstroms thick depending, inter alia, on the desired flexibility and the requisite conductivity. Layer 50 could also be transparent such as, for example, where a film of Dow Corning resin ECR 34 is coated on the surface of elastomer layer 44. Other conductive layers such as may occur to those skilled in the art may also be used within the scope of the invention. The voltage levels typically required to form and "lock" the deformation images, i.e., permanently deform the elastomer, would be in the range of from about 1 to about 25,000 volts depending, inter alia, on the thickness and other characteristics of elastomer layer 30.

Thin conductive layer 50 typically has sufficient conductivity to become an equipotential surface when connected to an electrical energy source; sufficient flexibility to follow the deformations of the elastomer; sufficient fatigue resistance to withstand numerous and rapid formations and erasures of surface deformations; and, in some cases, high opacity and reflectivity as when being read out by a high intensity light source to which the photoconductive layer is sensitive.

Conductive layer 50 preferably comprises gold and indium. Although layer 50 may be formed on elastomer layer 30 by various methods such as, for example, by chemical reaction, precipitation out of a solution, electrophoresis, electrolysis, etc., it is preferred to form the layer by vacuum evaporation techniques. For a detailed description of the vacuum evaporation technique for forming metal layers including gold and indium on elastomer layer surfaces, see U.S. Pat. No. 3,716,359. It should be noted there that other materials may be added to the metallic layers to enhance or suppress particular characteristics such as, for example, spectral reflectivity and corrosion resistance.

Optionally, the imaging device illustrated in FIG. 4 may also include a transparent layer 52 of an insulating liquid, for example, oil. There are a number of advantages provided by the use of layer 52. The insulating liquid layer serves an important function when it has an index of refraction different than that of air. The presence of layer 52 over the flexible conductive layer 50 means light propagating from above the member will be modulated more than it would if only air were present. The reason for this is that for the same magnitude of surface deformation, the optical path changes are proportional to the refraction index of the medium adjacent to the surface. As a consequence, if it were desired to maintain the same modulation as is provided by a device without layer 52, it would be possible to do so at lower voltages thereby ameliorating the possibility of voltage breakdown. A second advantage is that layer 52 serves as protection for conductive layer 50 by isolating it from contamination by dust or the like, maintaining a more constant ambient environment, etc. Additionally, layer 52 makes less stringent the fabrication requirements for the imaging member. The presence of pin holes in the elastomer layer 30 may cause the imaging member to short circuit, possibly destroying its performance. The addition of layer 52 may prevent such short circuits from disrupting the performance of the member by allowing insulating liquid to flow into such pin holes.

The advantageous imaging system of the present invention will be further described with respect to a specific preferred embodiment by way of an Example, it being understood that this is intended to be illustrative only and the invention is not limited to the materials, procedures or conditions recited therein. All parts and percentages are by weight unless otherwise specified.

EXAMPLE

A photoconductive composition is prepared by first dissolving about 3.5 gms. of poly-n-vinylcarbazole in about 100 ml of cyclohexanone. To about 20 ml of this solution are added 1 ml of a solution of about 3 gms. of o-dinitrobenzene dissolved in about 100 ml of a 50/50 by volume mixture of methanol/ethanol and about 1 ml of a solution of about 3 gms. trichloroacetic acid dissolved in about 100 ml of a 50/50 by volume mixture of methanol/ethanol. A NESA glass electrode (a conductive transparent tin oxide layer on a glass substrate available from Pittsburgh Plate Glass Co.) is dipped into the solution and withdrawn so as to form a photoconductive layer having a thickness of about 1 to about 5 $\mu$m after evaporation of residual solvent. Removal of the solvents is accomplished by suspending the coated electrode in a vacuum oven at a temperature of about 100°C at a pressure of less than 1mm Hg for about 12 to 18 hours.

Semitransparent gold electrodes about 0.3 cm$^2$ in surface area are deposited on the free surface of the photoconductive layer by vacuum evaporation. Thin wire leads are fastened to the electrodes with silver paint. The sample is then placed in a light tight holder directly in front of the exit slit of a prism monochromator. A bias of about −20 volts D.C. is then applied between the NESA electrode and the gold electrodes. The current is measured with a picoammeter and recorded on an X-Y recorder as a function of time for various wavelengths of exciting radiation. Photoresponse is observed in the wavelength region of from about 3500 Angstroms to about 10000 Angstroms. For wavelengths longer than 6800 Angstroms the photocurrent decays essentially instantaneously as the exciting radiation is removed. At shorter wavelengths at least about 35% of the photocurrent persists for about several hundred seconds after the removal of the exciting radiation.

An imaging member is provided by first depositing a thin layer of gold over a NESA glass electrode and then forming a layer of the photoconductive composition described above on the free surface of the gold layer. An approximately 5 micron thick layer of an elastomer comprising a dimethylpolysiloxane gel is applied over the photoconductive layer and a thin flexible conductive gold-indium layer which serves as a second electrode is applied to the free surface of the elastomer layer. An electrical field is established across the imaging member by applying a potential to the electrodes and the member is then exposed through the NESA glass electrode to a first image pattern made up of visible light having wavelength about 6800 Angstroms. There are formed in the imaging member two images corresponding to the first and second image patterns and these images are observed by projecting them in reflection with a Schlieren optical system.

Both patterns of exciting radiation are then removed from the imaging member and the electrical field is maintained across the imaging member. An image corresponding to the first image pattern continues to be observed; however, the image corresponding to the second image pattern disappears essentially simultaneously with the removal of the second image pattern. After the first image is stored for about one hundred seconds it is erased by removing the field and exposing the photoconductor uniformly to activating radiation.

The imaging member is then dark rested and subsequently, without any additional imagewise exposure, the electrical field is again established across the member. The first image is observed but the second image is not. With the electrical field on the first image is maintained for about thirty minutes.

It will be understood that various changes in the details, materials, steps and arrangement of elements which have been described herein and illustrated in order to explain the nature of the invention will occur to and may be made by those skilled in the art upon a reading of this disclosure and such modifications are intended to be included within the principle of the invention and the scope of the claims.

What is claimed is:

1. An imaging method comprising
providing an imaging member comprising a voltage or current-sensitive light modulating layer overlying a layer of photoconductive material which exhibits persistent photoconduction which overlies a layer of a metal capable of generating photoinjection currents in response to radiation which it absorbs;
applying an electrical field across said imaging member;
exposing said photoconductive layer to a first image pattern of activating electromagnetic radiation; and
exposing said photoinjection current generating metal layer to a second imagewise pattern comprising wavelengths of radiation which are absorbed by said layer whereby images corresponding to said first and second imagewise patterns are formed in said imaging member.

2. The method as defined in claim 1 wherein said imaging member further includes a substrate adjacent said photoinjection current generating metal layer.

3. The method as defined in claim 2 wherein said substrate comprises a transparent conductive layer.

4. The method as defined in claim 3 wherein said imaging member further includes an electrode overlying said voltage or current sensitive light modulating layer and the electrical field is established between said electrodes and said transparent conductive substrate.

5. The method as defined in claim 4 and further including the step of optically reconstructing the images formed in the imaging member.

6. The method as defined in claim 5 wherein said optical reconstruction step is carried out with reflected light.

7. The method as defined in claim 4 wherein said photoinjection current generating layer is opaque.

8. The method as defined in claim 4 wherein said photoinjection current generating layer is transparent and said photoconductive layer is not substantially sensitive to the wavelengths of radiation comprising the second image pattern.

9. The method as defined in claim 8 wherein said photoinjection current generating layer has a thickness of from about 50 Angstroms to about 400 Angstroms and a work function of from about 4 eV to about 6 eV.

10. The method as defined in claim 9 wherein said photoinjection current generating layer comprises a member selected from the group consisting of gold, copper, aluminum, silver, indium, chromium and mixtures thereof.

11. The method as defined in claim 4 and further including spatially modulating at least one of said first and second image patterns at some desired spatial frequency.

12. The method as defined in claim 11 wherein said imaging member further includes spatial light modulation means between said photoinjection current generating layer and said photoconductive layer.

13. The method as defined in claim 4 and further including the steps of removing said second image pattern and exposing said photoinjection current generating metal layer to a third imagewise pattern comprising wavelengths of radiation which are absorbed by said layer.

14. The method as defined in claim 4 and further including the step of erasing said images formed in said imaging member.

15. The method as defined in claim 14 wherein said erasing step includes removing said electrical field from said imaging member.

16. The method as defined in claim 15 wherein said erasing step includes heating at least the photoconductive layer of said imaging member to a temperature sufficient to remove the persistent conductivity pattern generated in said photoconductive layer as a result of exposure to said first image pattern.

17. The method as defined in claim 4 wherein said voltage or current sensitive light modulating layer comprises liquid crystalline material.

18. The method as defined in claim 4 wherein said voltage or current sensitive light modulating layer comprises an electrooptic effect material.

19. The method as defined in claim 4 wherein said voltage or current sensitive light modulating layer comprises a suspension comprising imaging particles in an electrically insulating liquid.

20. The method as defined in claim 4 wherein said voltage or current sensitive light modulating layer comprises an elastomer material.

21. The method as defined in claim 20 wherein said electrode comprises a layer of a conductive liquid.

22. The method as defined in claim 20 wherein said electrode comprises a layer of a conductive gas including means for ionizing said gas.

23. The method as defined in claim 20 wherein said electrode comprises a flexible conductive metallic layer.

24. The method as defined in claim 23 wherein said imaging member further includes a layer of an insulating liquid overlying said electrode.

25. The method as defined in claim 24 and further including the step of optically reconstructing the images formed in said imaging member by means of a phase sensitive image reconstruction system.

26. The method as defined in claim 25 and further including erasing said images by steps including reversing the polarity of the electrical field established across the imaging member.

27. The method as defined in claim 26 wherein said step of erasing further includes exposing said photoconductive layer to a uniform pattern of activating electromagnetic radiation.

28. An imaging method comprising
providing an imaging member comprising a voltage or current-sensitive light modulating layer overlying a layer of a photoconductive material which exhibits persistent photoconduction which overlies a layer of a metal capable of generating photoinjection currents in response to radiation which it absorbs;
applying an electrical field across said imaging member;
exposing said photoconductive layer to a first pattern of activating electromagnetic radiation which is provided by spatially modulating uniform activating electromagnetic radiation;
exposing said photoinjection current generating metal layer to a second imagewise pattern comprising wavelengths of radiation which are absorbed by said layer whereby an image corresponding to said second imagewise pattern modulated by said first pattern is formed in said imaging member.

29. The method as defined in claim 28 wherein said imaging member further includes a substrate adjacent said photoinjection current generating layer.

30. The method as defined in claim 29 wherein said substrate comprises a transparent conductive layer.

31. The method as defined in claim 30 wherein said imaging member further includes an electrode overlying said voltage or current sensitive light modulating layer and the electrical field is established between said electrode and said transparent conductive substrate.

32. The method as defined in claim 31 and further including the step of optically reconstructing the image formed in the imaging member.

33. The method as defined in claim 32 wherein said photoinjection current generating layer has a thickness of from about 50 Angstroms to about 400 Angstroms and a work function of from about 4 eV to about 6 eV.

34. The method as defined in claim 33 wherein said photoinjection current generating layer comprises a member selected from the group consisting of gold, copper, aluminum, silver, indium, chromium, and mixtures thereof.

35. The method as defined in claim 32 wherein said voltage or current sensitive light modulating layer comprises an elastomer and said electrode comprises a flexible conductive metallic layer.

36. The method as defined in claim 35 wherein said imaging member further includes a layer of an insulating liquid overlying said electrode.

37. The method as defined in claim 36 and further including the step of erasing said image.

\* \* \* \* \*